(12) United States Patent
Han et al.

(10) Patent No.: US 8,160,582 B2
(45) Date of Patent: Apr. 17, 2012

(54) METHOD, SYSTEM AND DEVICE FOR CALLED PARTY RECOVERY IN MOBILE SWITCH CENTER POOL

(75) Inventors: Runsheng Han, Shenzhen (CN); Hao Zhang, Shenzhen (CN); Xiaochun Cui, Shenzhen (CN); Sihai Ye, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 473 days.

(21) Appl. No.: 12/401,419

(22) Filed: Mar. 10, 2009

(65) Prior Publication Data

US 2009/0209252 A1 Aug. 20, 2009

Related U.S. Application Data

(63) Continuation of application No. PCT/CN2007/071011, filed on Nov. 2, 2007.

(30) Foreign Application Priority Data

Dec. 1, 2006 (CN) .......................... 2006 1 0160923

(51) Int. Cl.
*H04W 4/00* (2009.01)
(52) U.S. Cl. ...................... 455/433; 455/435.1; 455/445; 455/436
(58) Field of Classification Search .................. 455/7, 8, 455/10, 11, 14, 20, 21, 24, 29
See application file for complete search history.

(56) References Cited

U.S. PATENT DOCUMENTS 6,408,182 B1 * 6/2002 Davidson et al. ............. 455/433
6,819,929 B2 * 11/2004 Antonucci et al. ............ 455/445
7,463,613 B2 * 12/2008 Sylvain ......................... 370/338
2004/0185854 A1 * 9/2004 Artola et al. .................. 455/445

(Continued)

FOREIGN PATENT DOCUMENTS

CN 1819699 8/2006

(Continued)

OTHER PUBLICATIONS

Written Opinion of the International Searching Authority issued in corresponding PCT Patent Application No. PCT/CN2007/071011, mailed Feb. 14, 2008.

(Continued)

*Primary Examiner* — Kamran Afshar
*Assistant Examiner* — Shahriar Behnamian
(74) *Attorney, Agent, or Firm* — Brinks Hofer Gilson & Lione

(57) ABSTRACT

A method for called party recovery in an MSC Pool, applied in a system that comprises an HLR and an MSC Pool including multiple MSC/VLRs, includes configuring a backup server for each MSC/VLR in the MSC Pool; if an MSC/VLR serving a user is down, the user has not initiated any calling service or location update and the user is called, further includes: the HLR sending a call signaling to the backup server of the MSC/VLR that is down; the backup server of the MSC/VLR initiating a paging request to the user and initiating a location update for the user to the HLR; the HLR registering user data of the user at the backup server and switching the MSC/VLR serving the user to the backup server. The present invention also discloses other methods, systems and devices, which can solve the problem of called party recovery in the MSC Pool.

24 Claims, 6 Drawing Sheets

U.S. PATENT DOCUMENTS

2005/0192005 A1  9/2005  Blom et al.

FOREIGN PATENT DOCUMENTS

| CN | 1845532 | 10/2006 |
| CN | 1870536 | 11/2006 |
| EP | 1 571 860 A1 | 9/2005 |

OTHER PUBLICATIONS

Communication issued in corresponding European Patent Application No. 07121974.5, mailed Feb. 28, 2008.

First office Action issued in corresponding Chinese Patent Application No. 200710182052.5, mailed Dec. 4, 2009.

Global System for Mobile Communications, "Digital Cellular Telcommunications System (Phase 2+); Restoration Procedures (GSM 03.07 version 7.1.0 Release 1998)". ETSI TS 10 525 V7.1.0, Jan. 2000.

Office Action issued in corresponding Chinese Patent Application No. 200710182052.5, mailed Apr. 8, 2011.

Global System for Mobile Communications, "3$^{rd}$ Generation Partnership Project; Technical Specification Group Services and System Aspects; Intra-domain Connection of Radio Access Network (RAN) nodes to Multiple Core Network (CN) Nodes" Release 6. 3GPP TS 23.236, v6.2.0, Dec. 2005.

* cited by examiner

METHOD, SYSTEM AND DEVICE FOR CALLED PARTY RECOVERY IN MOBILE SWITCH CENTER POOL

CROSS-REFERENCE TO RELATED APPLICATIONS

This application is a continuation of International Application No. PCT/CN2007/071011, filed on Nov. 2, 2007, which claims priority to Chinese Patent Application No. CN200610160923.9, filed on Dec. 1, 2006, both of which are hereby incorporated by reference in their entireties.

FIELD OF THE INVENTION

The present invention relates to the techniques for a Mobile Switch Center (MSC) Pool, and particularly, to a method for called party recovery in an MSC Pool, a system for called party recovery in an MSC Pool, and a switch device and a signaling switch device.

BACKGROUND OF THE INVENTION

Currently, 3GPP has proposed a networking model which is different from a conventional networking model. In the networking model, a Base Station Controller (BSC) or a Radio Network Controller (RNC) may be connected to multiple servers. These servers may form an MSC Pool. The advantages of the networking model including the MSC Pool are as follows: within the MSC Pool, load sharing may be implemented among these servers; the interface signaling volume between the servers and the Home Location Register (HLR) may be reduced; within the MSC Pool, the interface information volume between the servers may be reduced so that call dropped rate is reduced; as for expansion, the planning of the core network and the radio access network may be done separately.

Regarding disaster recovery, the MSC Pool has an inherent disaster recovery function for a calling party. After a server serving a certain user is down, a new server in the MSC Pool will serve the user when the user initiates a calling service. However, for a called party, the user is unable to be called during a period of one periodic location update, and a new server in the MSC pool is able to serve the user only when the user initiates a location update after a period of one periodic location update. Specifically, if a server in the MSC Pool is down, the calling service for a user registered in the server that is down will not be affected; if the user does not initiate the calling service within a period of one periodic location update, the user cannot be called.

FIG. 1 shows a flow chart of signalings for a called party when a server is down in the prior art. MSC/Visitor Location Register (VLR) A and MSC/VLR B are two servers in an MSC Pool. A server in the MSC Pool is down (e.g., MSC/VLR A is down as shown in FIG. 1), a link from the HLR to the server is broken. When the HLR receives a Send Routing Information (SRI) message from a Gateway Switch Center (GMSC), since MSC/VLR A is down where the user is registered, the HLR is unable to send a Provide Roaming Number (PRN) message to MSC/VLR A, so that the HLR can not obtain a roaming number of the user from MSC/VLR A. Hence, the called party can not be called and connected within a period of one periodic location update.

If the user initiates a calling service or a location update during the period of one periodic location update, the called party can be successfully called after the user is registered in another server in the MSC Pool. If the user does not initiate any calling service or location update during the period of one periodic location update, the user can not be called as the called party successfully.

Therefore, it can be seen that the disaster recovery function for the called party in the conventional MSC Pool is not perfect. When a server is down, user information cannot be timely recovered, which makes it impossible for a user to be called as a called party successfully.

SUMMARY OF THE INVENTION

Embodiments of the present invention provide a method, a system and a switch device for called party recovery in a Mobile Switch (MSC) Pool, which may make the called party be recovered after an MSC/VLR in the MSC Pool is down.

Embodiments of the present invention also provide a method, a system and a switch device for called party recovery in an MSC Pool, which may make the called party be recovered within a period of one periodic location update after an MSC/VLR in the MSC Pool is down.

Embodiments of the present invention also provide a signaling switch device, which may send a signaling message to a related MSC/VLR that is currently reachable when an MSC/VLR in the MSC Pool is down or when an MSC/VLR in the MSC Pool is recovered after the MSC/VLR in the MSC Pool is down, so as to assist in the recovery of the called party.

Embodiments of the present invention also provides another signaling switch device, which may send a signaling message to a related MSC/VLR that is currently reachable when an MSC/VLR in the MSC Pool is down or when an MSC/VLR in the MSC Pool is recovered after the MSC/VLR in the MSC Pool is down, so as to assist in the recovery of the called party.

A method for called party recovery in a Mobile Switch Center (MSC) Pool, applied in a system that comprises a Home Location Register (HLR) and an MSC Pool including multiple Mobile Switching Centers/Visitor Location Registers (MSC/VLRs), includes configuring a backup server for each MSC/VLR in the MSC Pool; if an MSC/VLR serving a user is down, the user does not initiate a calling service or a location update, and the user is called, the method further includes:

sending, by the HLR, a call signaling to the backup server of the MSC/VLR that is down;

initiating, by the backup server of the MSC/VLR, a paging request to the user and initiating a location update for the user to the HLR;

registering, by the HLR, user data of the user at the backup server of the MSC/VLR and switching the MSC/VLR serving the user to the backup server of the MSC/VLR.

A method for called party recovery in a Mobile Switch Center (MSC) Pool, applied in a system that includes a Home Location Register (HLR) and an MSC Pool including multiple Mobile Switch Centers/Visitor Location Registers (MSC/VLRs), includes: configuring a backup server for each MSC/VLR in the MSC Pool; if an MSC/VLR serving a user is recovered within a period of one periodic location update after the MSC/VLR is down, the user has not initiated any calling service or location update, and the user is called during the period of one periodic location update, the method further comprising:

sending, by the HLR, a call signaling to the MSC/VLR that is recovered;

obtaining, by the MSC/VLR that is recovered, first user data of the user, updating location information of the user, recovering second user data of the user in the HLR, allocating a roaming number of a local server for the user and returning the roaming number to the HLR.

A system for called party recovery in a Mobile Switch Center Pool includes: a Home Location Register (HLR) and a backup server of each MSC/VLR in the MSC Pool including multiple Mobile Switch Centers/Visitor Location Registers (MSC/VLRs); wherein the HLR is configured to send, when an MSC/VLR serving a user is down, the user has not initiated any calling service or location update and the user is called, a call signaling to the backup server of the MSC/VLR that is down; insert, when the backup server initiates a location update, user data of the user to the backup server and switch the MSC/VLR serving the user to the backup server;

the backup server of the MSC/VLR that is down is configured to back up the user data of the user on the MSC/VLR, initiate a paging request to the user and initiate a location update for the user when receiving the call signaling from the HLR, register the user data of the user inserted by the HLR.

A system for called party recovery in a Mobile Switch Center Pool includes: a Home Location Register (HLR) and an MSC Pool including multiple Mobile Switch Centers/Visitor Location Registers (MSC/VLRs) wherein the MSC Pool further comprises a backup server of each MSC/VLR; wherein the HLR is configured to, when an MSC/VLR serving a user is down and is recovered within a period of one periodic location update, the user has not initiated any calling service or location update within the period of one periodic location update, and the user is called, send a call signaling to the MSC/VLR that is recovered, output user data of the user to the MSC/VLR that is recovered, and receive a roaming number of the user from the MSC/VLR that is recovered;

the MSC/VLR is configured to, when the MSC/VLR that is down is recovered within the period of one periodic location update, obtain backup user data of the user from the backup server of the MSC/VLR after receiving the call signaling, update location information of the user, obtaining the user data of the user from the HLR and recover the user data, allocate a roaming number for the user and return the roaming number to the HLR.

A switch device, located in a Mobile Switch Center (MSC) Pool including multiple Mobile Switch Centers/Visitor Location Registers (MSC/VLRs), wherein the switch device is a backup server of at least one MSC/VLR in the MSC Pool, and the at least one MSC/VLR is a main server of the switch device, and the switch device includes:

a first module, configured to store backup user data of on the main server;

a second module, configured to, when a called user in a call signaling is not a user of a local server and the call signaling is not for calling the local server, obtain the backup user data of the called user from the first module, initiate a paging request to the called user, initiate a location update for the called user, remove the backup user data of the called user from the first module, and switch the switch device in which the second module is located to a new switch device serving the called user.

A switch device, as a main server in a Mobile Switch Center (MSC) Pool including multiple Mobile Switch Centers/Visitor Location Registers (MSC/VLRs), wherein the MSC Pool further includes a backup server of the switch device, and the switch device includes:

a third module, configured to, when a called user in a call signaling is not a user of a local server and the call signaling is for calling the local server, obtain backup user data of the called user from the backup server of the switch device, update location information for the called user, recover user data of the called user, and send a roaming number of the called user.

DETAILED DESCRIPTION OF THE INVENTION

The method provided by the present invention for called party recovery in an MSC Pool includes: making an SRI message from the HLR be delivered to a server in the MSC Pool that is not down, initiating a paging request to a called party on the server, and performing an implicit location update for the user as the called party after the user responds to the paging request, after that updating the number of the MSC serving the user to the HLR. In this way, the call may be successfully established when the user becomes the called party again.

Because a wireless area covered by an MSC Pool is large and multiple servers serve the wireless area, it is impossible to page for all BSC/RNCs within the MSC Pool. A VLR Data Backup (VDB) technology is used to solve this problem. That is, the backup of user data is created at a server that initiates the paging request. The backup of user data includes an International Mobile Subscriber Identity (IMSI) and a Location Area Identity (LAI).

This method includes three parts: configuring routing priority or the load sharing of SCCP destination signaling point; VLR data backup; the procedure for obtaining the user data of the called party from a backup VLR via signaling interaction. The processing of these three parts is hereinafter described in detail.

I. Routing Priority and the Main/Backup Load Sharing of SCCP Destination Signaling Point.

In this method, it is feasible to configure either routing priority or the main/backup sharing of SCCP destination signaling point. By configuring the routing priority or the load sharing of SCCP destination signaling point, the first message to the called party may be delivered to another server that is not down after a server in which the user data of the called party is registered is down.

1. Routing Priority.

Figure 1:
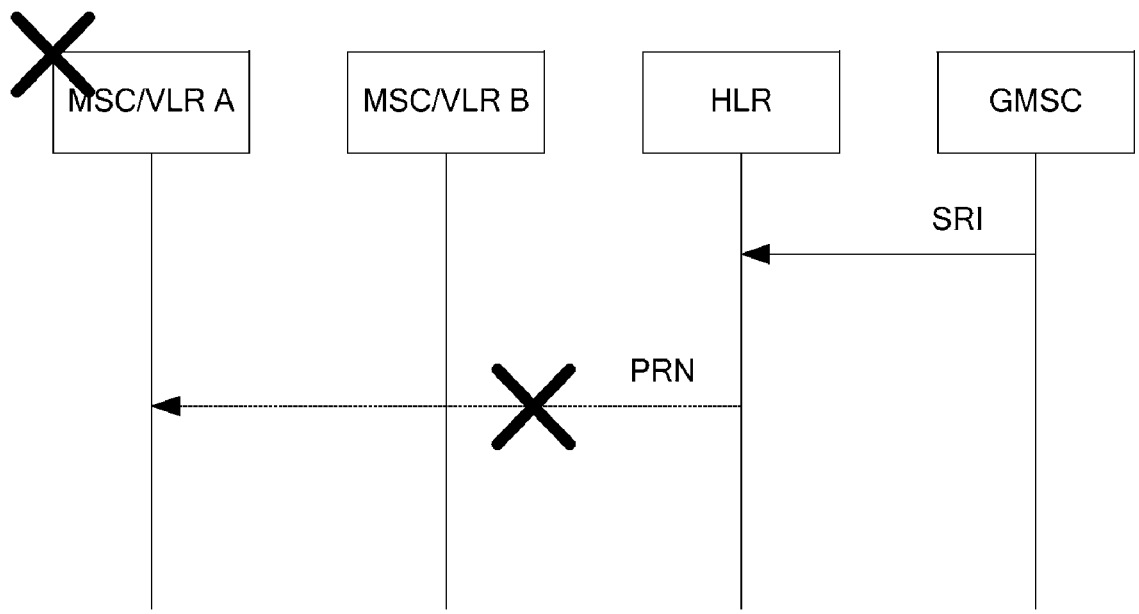
FIG. 1 shows a flow chart of signaling for a called party when a server is down in the prior art.
Figure 2A:
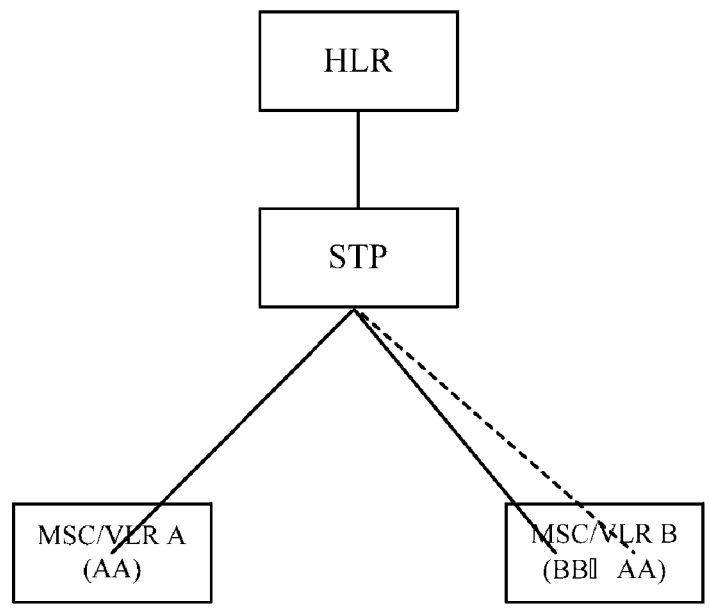
FIGS. 2A and 2B show a schematic diagram illustrating routing priority and the main/backup load sharing of Signaling Connection Control Part (SCCP) destination signaling point according to an embodiment of the present invention respectively.

As shown in FIG. 2A, when MSC/VLR B is a backup server of MSC/VLR A, two routes should be configured at a Signaling Transfer Point (STP): a direct route from the STP to signaling point AA of MSC/VLR A; an indirect route from the STP to signaling point AA of MSC/VLR A via signaling point BB of MSC/VLR B. The direct route is configured as a route with high priority, and the indirect route is configured as a route with low priority. Further, the addressing mode of the STP and the MSC Pool is required to be Destination Signaling Point Code (DPC)+Sub-System Number (SSN), and in MSC/VLR B, signaling point BB is required to be configured as a complementary signaling point of signaling point AA. In this way, when MSC/VLR A operates normally, signalings from the HLR to signaling point AA via the STP will be delivered through the direct route with high priority, and when MSC/VLR A fails, signalings from the STP to signaling point AA will be delivered to MSC/VLR A via the indirect route with low priority. Because signaling point BB of MSC/VLR B is the complementary signaling point for signaling point AA, the signalings from the STP to signaling point AA will be processed at MSC/VLR B.

2. The Main/Backup Sharing of SCCP Destination Signaling Point.

Figure 2B:
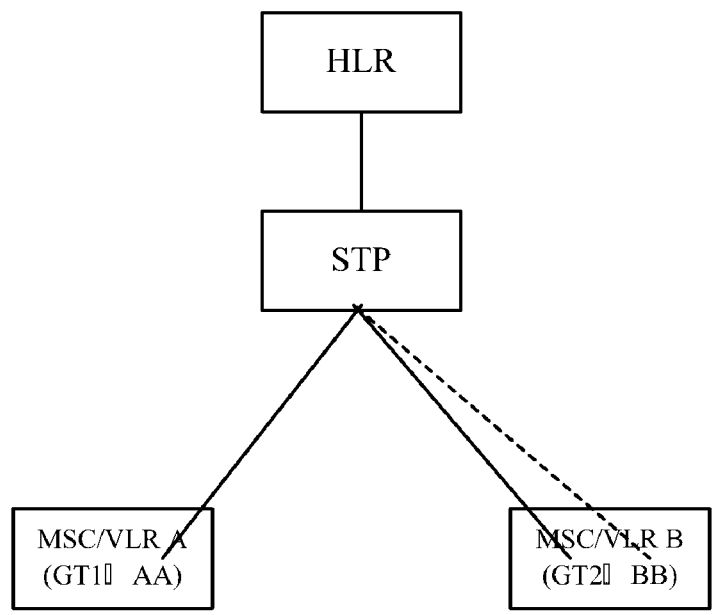

As shown in FIG. 2B, when MSC/VLR B is a backup server of MSC/VLR A, the following processing is performed for data on the STP: configuring addressing data of Global Title (GT) 1 as AA+SSN, and configuring signaling point BB as an SCCP load sharing signaling point of signaling point AA with priority lower than that of signaling point AA. In this way, when MSC/VLR A operates normally, the signalings sent by the HLR to GT1 via the STP will be delivered to the signaling point AA (i.e., MSC/VLR A) with high priority. When MSC/VLR A fails, the signalings sent by the STP to GT1 will be delivered to signaling point BB (i.e., MSC/VLR B) as the load sharing signaling point with low priority, hence the signalings sent by the STP to GT1 will be processed at MSC/VLR B. It should be noted that the STP needs to support the function of SCCP load sharing in this scheme.

II. VLR Backup.

In this method, either the chain-style backup or the centralized backup may be used. Because the physical area covered by an MSC Pool is very large and one RNC/BSC is served by all servers in the MSC Pool, it is usually not allowed to page for all BSC/RNCs within the MSC Pool. User data (e.g., an IMSI/LAI) in a server should be backed up within the MSC Pool to solve the problem. The networking structure with the above two backup models is described hereafter respectively.

Figure 3:
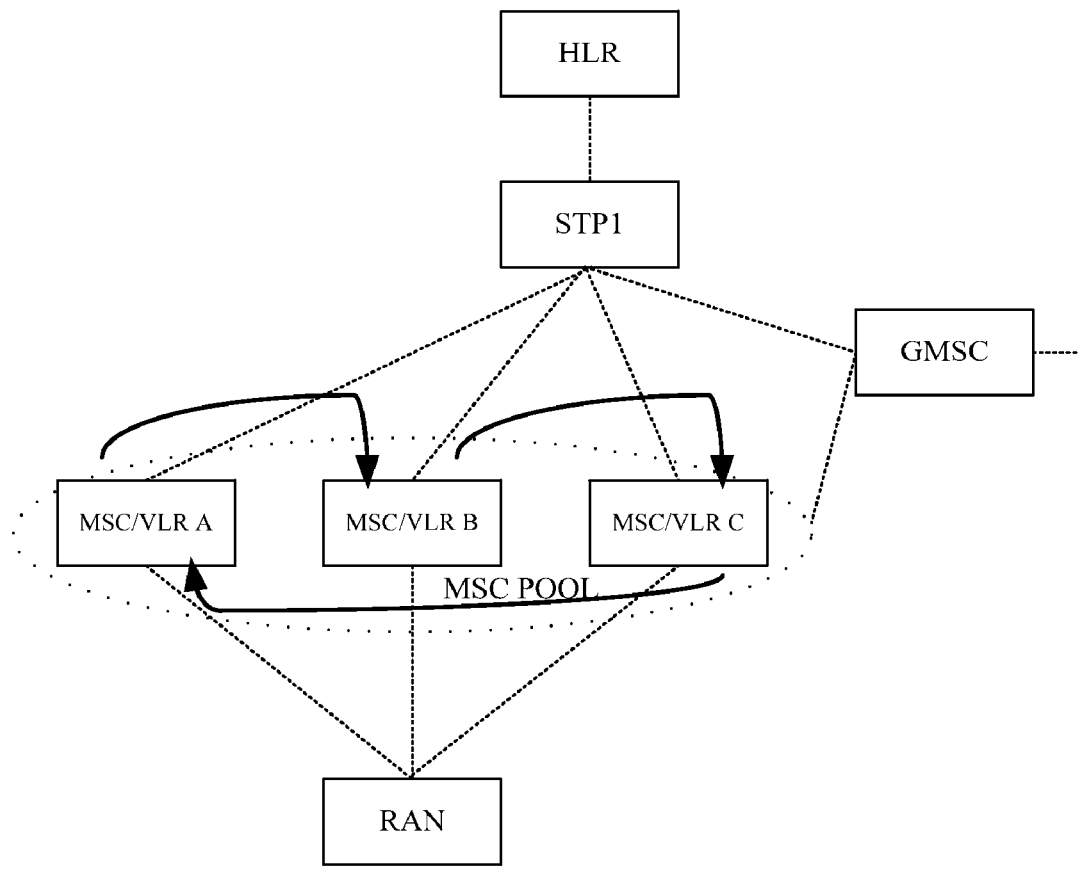
FIG. 3 shows a networking structure with a chain-style VLR backup according to an embodiment of the present invention.

FIG. 3 illustrates a networking structure with the chain-style VLR backup according to an embodiment of the present invention. As shown in FIG. 3, the networking structure includes: HLR, STP1, Gateway MSC (GMSC), MSC Pool and RAN. The HLR may send, via STP, a call signaling to the GMSC and each server in the MSC Pool which are connected to the STP1. The GMSC may send the call signaling from STP1 to an external network or send a call signaling from the external network to each MSC/VLR in the MSC Pool. Each MSC/VLR in the MSC Pool, after receiving the call signaling, may initiate a paging request to a called terminal or exchange information with the called terminal via the RAN. Within the MSC Pool, each MSC/VLR adopts a chain-style backup, in other words, MSC/VLR B is used for backing up MSC/VLR A, MSC/VLR C is used for backing up MSC/VLR B, and MSC/VLR A is used for backing up MSC/VLR C.

Figure 4:
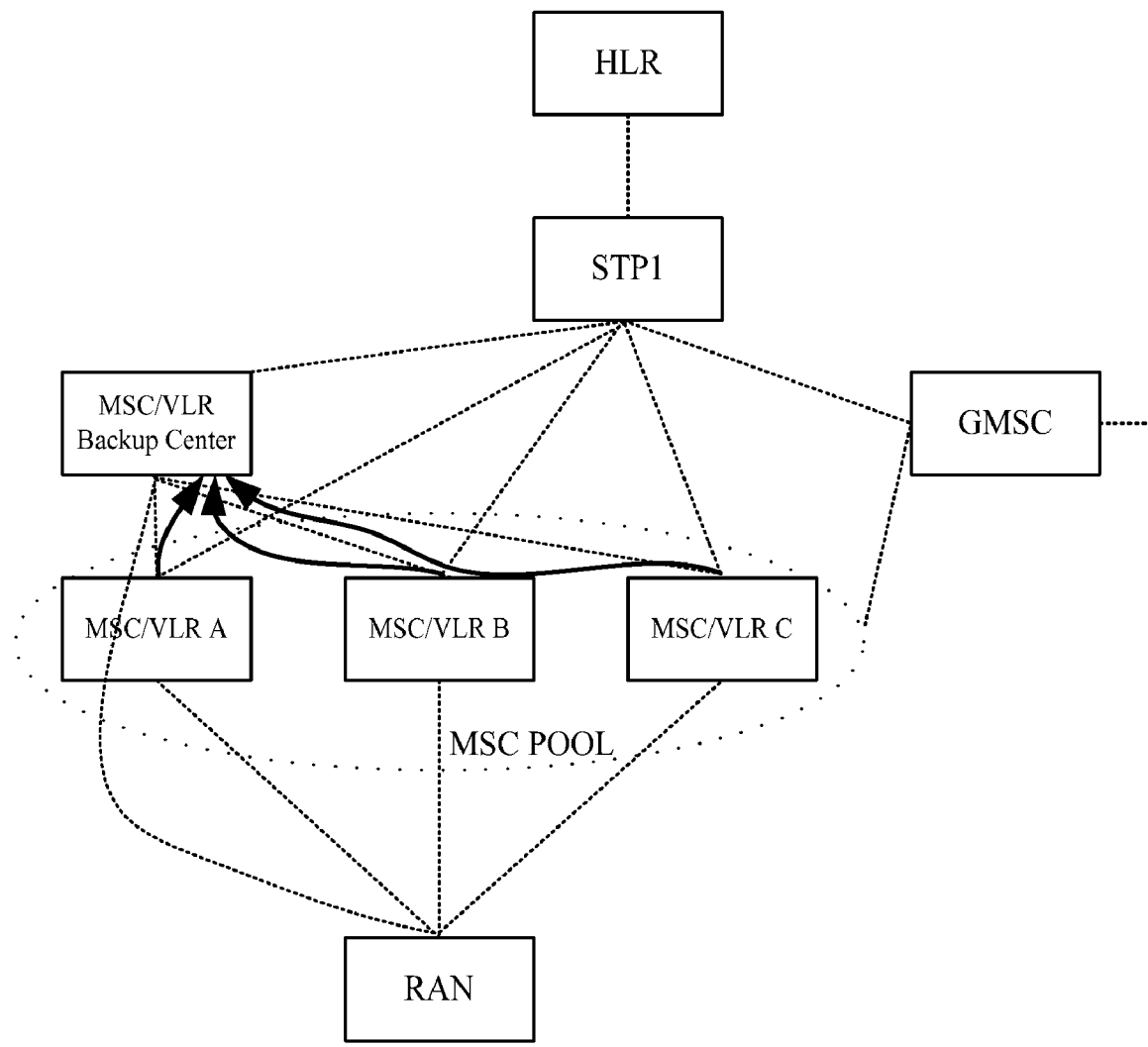
FIG. 4 shows a networking structure with a centralized VLR backup according to an embodiment of the present invention.

FIG. 4 illustrates a networking structure with the centralized VLR backup according to an embodiment of the present invention. The networking structure in FIG. 4 is similar to that in FIG. 3 and includes: HLR, STP1, GMSC, MSC Poor and RAN. The HLR may send, via STP1, a call signaling to the GMSC and each server in the MSC Pool which are connected to the HLR. The GMSC may send the call signaling from STP1 to an external network or send a call signaling from the external network to each MSC/VLR in the MSC Pool. Each MSC/VLR in the MSC Pool, after receiving the call signaling, may initiate a paging request to a called terminal or exchange information with the called terminal. The difference between the networking structure shown in FIG. 4 and that shown in FIG. 3 is that, the MSC Pool further includes an MSC/VLR Backup Center in FIG. 4, and each MSC/VLR may create its own backup at the MSC/VLR Backup Center. As shown in FIG. 4, MAC/VLR A, MSC/VLR B and MSC/VLR C are connected to the MSC/VLR Backup Center, and the MSC/VLR Backup Center is the backup MSC/VLRs of MSC/VLR A, MSC/VLR B and MSC/VLR C. The MSC/VLR Backup Center has simple MSC functions, and may initiate a paging request to a called terminal or exchange information with the called terminal via the RAN.

In an embodiment of the present invention, the MSC Pool contains three MSC/VLRs (MSC/VLR A, MSC/VLR B, and MSC/VLR C), nevertheless, the present invention does not limit the number of MSC/VLRs in the MSC Pool. Further, only one STP (STP1) and one MSC/VLR Backup Center are shown in the networking structure, but in an actual network, there may be multiple STPs and MSC/VLR Backup Centers, which are omitted in the figures.

Based on the networking structure in FIG. 3 or FIG. 4, a paging request may be delivered to a user served by an MSC/VLR that is down. After the user responds to the paging request, an implicit location update may be performed for the user, and refresh the MSC number of the user in the HLR. In this way, when the user is called for the second time, the call may be connected, i.e., the called party is recovered. Based on the above networking structures, the detail implement for the called party recovery is described with the procedures hereafter.

III. Backup VLRs Obtain User Data Via Signaling Interaction. The Procedure is Described in Detail with FIGS. 5 and 6.

Figure 5:
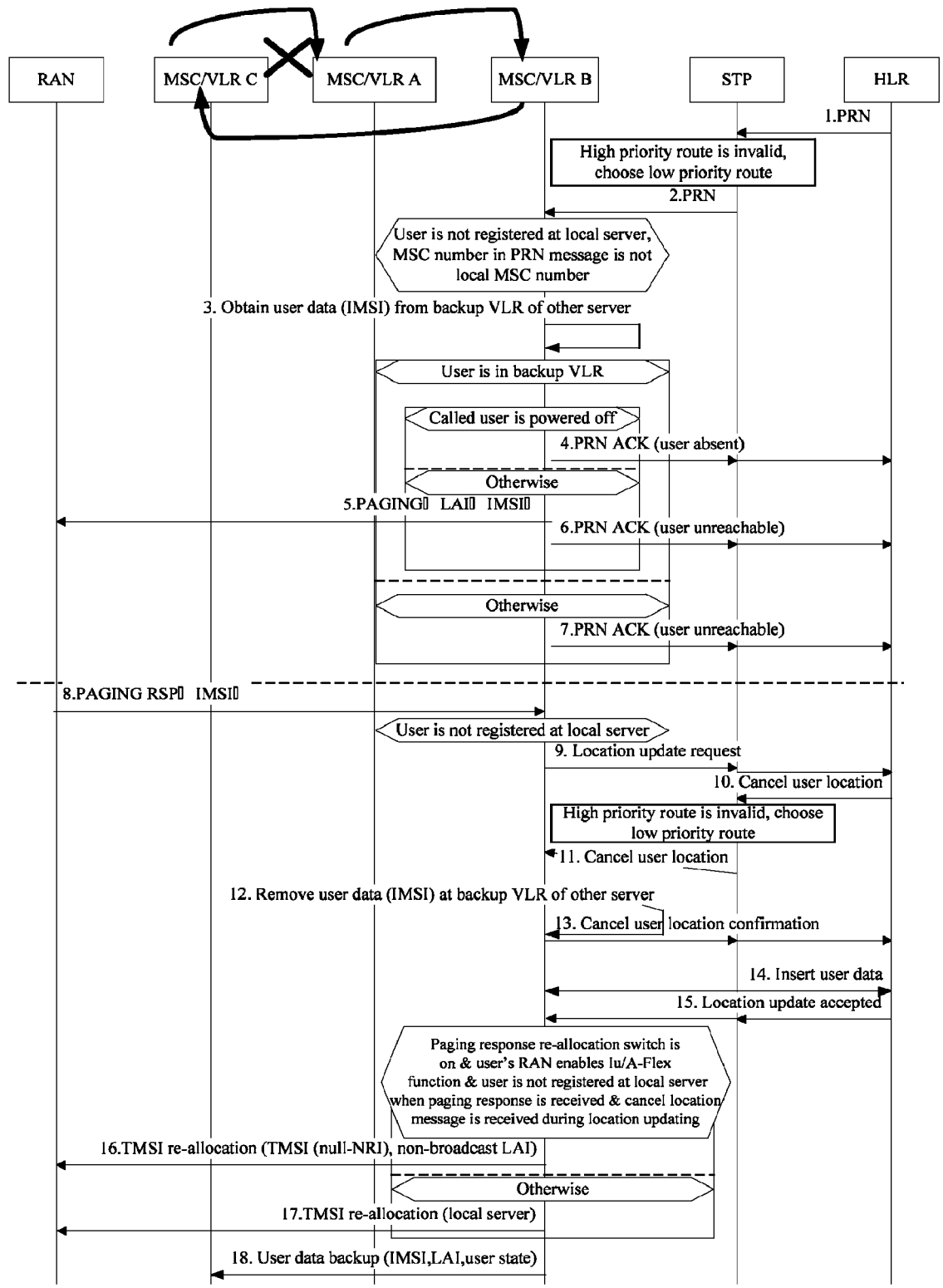
FIG. 5 shows a flow chart of signalings when a called party is called for the first time after a server is down according to an embodiment of the present invention.

FIG. 5 shows a flow chart of signaling when a user is called for the first time when a server is down according to an embodiment of the present invention. FIG. 5 shows three servers, namely MSC/VLR A, MSC/VLR B and MSC/VLR C in the MSC Pool. The three servers adopt a chain-style backup. Specifically, data on MSC/VLR A is backed up in MSC/VLR B, data on MSC/VLR B is backed up in MSC/VLR C, and data on MSC/VLR C is backed up in MSC/VLR A. Furthermore, according to the aforementioned method for configuring routing priority, the priority of the direct route to an MSC/VLR signaling point is higher than the priority of the indirect route to the MSC/VLR signaling point via the signaling point of the backup server of the MSC/VLR. For example, the priority of the direct route to signaling point AA of MSC/VLR A is higher than the priority of the indirect route to signaling point AA of MSC/VLR A via signaling point BB of MSC/VLR B. When MSC/VLR A is down, the indirect route to signaling point AA via signaling point BB of MSC/VLR B will be used.

When MSC/VLR A is down, the signaling procedure when a user registered in MSC/VLR A is called for the first time includes the following processes.

Process 1: The HLR sends, via the STP, a PRN message to MSC/VLR A to obtain the roaming number for the called party.

Process 2: Since MSC/VLR A fails, according to the above configuration of routing priority, when the route with high priority becomes invalid, the route with low priority will be chosen. Therefore, the STP sends the PRN message to MSC/VLR B, wherein the addressing mode is DPC+SSN.

Process 3: MSC/VLR B receives the PRN message, determines that the PRN message may be processed at the local server. When the MSC number of the user in the VLR needs to be replaced with the MSC number of the user in the PRN message, it is necessary to determine whether the MSC number of the user is the MSC number of a local server, and if the MSC number of the user is not the MSC number of the local server, the MSC number of the user in the VLR will not be replaced.

When MSC/VLR B receives the PRN message, if the user is not registered in the local server and the MSC number of the user in the PRN message is not the MSC number of the local server, user data is obtained from the backup server of MSC/VLR B (i.e., the backup VLR of MSC/VLR B); if the user data is in the backup VLR, Process 4 is performed; if the user data is not in the backup VLR, Process 7 is performed.

Process 4: If the called user is in a power-off state, MSC/VLR B returns a PRN ACK message indicating that the called user is absent to the HLR, and Process 8 is performed; otherwise Process 5 is performed.

Processes 5~6: MSC/VLR B sends a paging request containing the IMSI of the user and the LAI in backup user data to the Radio Access Network (RAN) to page the called user. In this case, MSC/VLR B starts a timer, and pages the called user with the LAI in the backup user data. The delivery of one paging request has a sufficiently high success probability, for saving network resources and reducing the impact on networks, thus in this embodiment only one paging request is delivered and the delivery of multiple paging requests is disallowed. A PRN ACK message indicating that the user is unreachable is returned to the HLR after the timer expires, and Process 8 is performed. In this case, to prevent the user from being called before the user responds to the paging request or during the process of the paging request, the PRN ACK message should be sent after a delay. Hence the duration of the timer may be configured, i.e., may be added, and the PRN ACK message is sent after the timer expires. In other embodiments of the present invention, repetitious paging requests may be delivered, and the times of delivering the paging request may be configured. After the timer for the last paging request expires, a PRN ACK message is returned to the HLR to indicate that the user is unreachable.

In other embodiments of the present invention, after the paging request is initiated, a timer for a paging response may be activated. If the RAN returns a paging response before the timer expires, a PRN ACK message containing a roaming number of the user is returned to the HLR. After the timer expires, if the RAN has not returned any paging response, a PRN ACK message indicating that the user is unreachable is returned to the HLR, and Process 8 is performed. In this way, if a paging response is received from the RAN before the timer expires, the roaming number of the user is returned so that the user may be successfully called for the first time after the server is down.

Process 7: MSC/VLR B activates a timer, sends the HLR a PRN ACK message indicating that the user is unreachable, and terminates the signaling procedure.

Processes 8~9: The RAN returns a paging response to MSC/VLR B which initiates this paging request. If the corresponding user is not registered in MSC/VLR B (that is, the user is not registered in the local server) and the user identifier of the user in the paging response is the IMSI, an implicit location update is performed, and a location update request is sent to the HLR.

Processes 10~11: The HLR sends a cancel user location message to MSC/VLR A, and because MSC/VLR A fails, the STP will send the cancel user location message to the backup server of MSC/VLR A, i.e., MSC/VLR B, according to the configuration of the routing priority.

Processes 12~13: If MSC/VLR B receives the cancel user location message during the location update, user data (mainly IMSI) in the main VLR is not deleted, but user data in the backup VLR is deleted. In other words, only the user data backed up at the local server (i.e., MSC/VLR B) by the main server of MSC/VLR B (i.e., MSC/VLR A) needs to be deleted, and the user data backed up at the backup server of the local server (i.e., MSC/VLR C) by the local server (i.e., MSC/VLR B) does not need to be deleted. After that, a cancel user location confirmation message is sent to the HLR.

In every MSC/VLR, a main VLR and a backup VLR are configured. The main VLR is used to store the user data of local server, and the backup VLR is used to store user data of another server. For MSC/VLR B, the user data of the local server (i.e., MSC/VLR B) is backed up at the backup VLR of the backup server (i.e., MSC/VLR C) of MSC/VLR B, and the user data of the main server (i.e., MSC/VLR A) of MSC/VLR B is backed up at the backup VLR of the local server (i.e., MSC/VLR B). The addresses of the backup VLR of the local server (which may be understood as the VLR where the user data of the local server is backed up) and the backup VLR of the main server (which may be understood as the VLR where the user data of the main server is backed up) are determined by the data configuration. The term "server" described in the present invention refers to a switch node in the communication system, e.g., an MSC/VLR.

Processes 14~15: The HLR inserts user data into MSC/VLR B, including all user subscription data of the user, such as forwarding information, CAMEL subscription data, Operator Determined Barring (ODB) information, and so on, and sends a Location Update Accepted message to MSC/VLR B.

Processes 16~17: When the paging response is received, if the TMSI re-allocation switch is on, and the Iu/A-Flex function of the RAN to which the user belongs is used, and the user is not registered in the local server and a cancel user location message is received during the location update, MSC/VLR B allocates a Temporary Mobile Subscriber Identity (TMSI) containing a null Network Resource Identifier (null-NRI) to the user, and sends a TMSI re-allocation command containing the allocated TMSI and a non-broadcast Location Area Identity (LAI) to the RAN, so as to deliver the TMSI and the non-broadcast LAI to the user terminal. After receiving the non-broadcast LAI, the user terminal initiates a location update procedure to the RNC, and because the RNC receives the null-NRI, the RNC allocates a new MSC/VLR for the user terminal, thus the users originally registered in MSC/VLR A may be evenly re-registered in each of the MSCs in the MSC Pool so as to realize the load sharing in the MSC Pool. Otherwise, MSC/VLR B allocates local TMSI to the user and sends a TMSI re-allocation command containing the allocated local TMSI to the RAN, so as to deliver the TMSI to the user terminal.

Process 18: MSC/VLR B sends user data backup command containing such information as the IMSI, the LAI and the user state to the backup server of MSC/VLR B, i.e., MSC/VLR C, and this paging processing is terminated.

In this way, the MSC number of the user recorded in the HLR is the number of MSC B, hence, when the user is called for the second time, the HLR will call the user through MSC/VLR B, so that the user as the called party is called successfully.

Furthermore, if the server in the MSC Pool that is down is recovered within a period of one periodic location update, and the users originally served by the server has not initiated any calling service or performed a location update with another server in the MSC Pool, the users as called parties can not be called successfully. For solving this problem, the server that was down needs to obtain the user data from the backup server, and then delivers the paging request.

Figure 6:
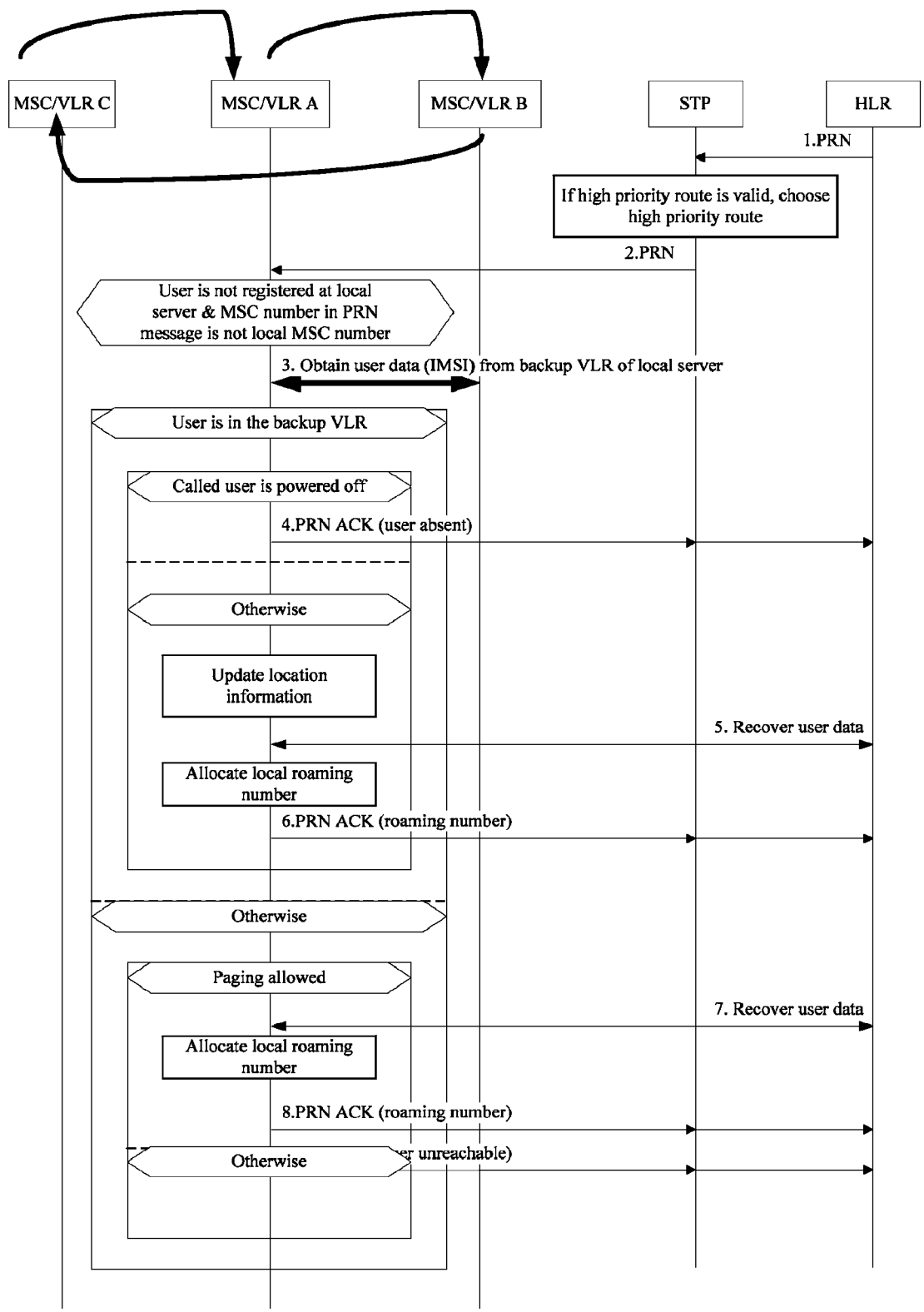
FIG. 6 shows a flow chart of signalings for recovering user data of a called party after a server is down according to an embodiment of the present invention.

FIG. 6 shows a flow chart of signaling when the user data of a called party is recovered when a server is down according to an embodiment of the present invention. FIG. 6 shows three servers, namely MSC/VLR A, MSC/VLR B and MSC/VLR C, in the MSC Pool. The three servers form a chain-style backup. Data on MSC/VLR A is backed up in MSC/VLR B, data on MSC/VLR B is backed up in MSC/VLR C, and data on MSC/VLR C is backed up in MSC/VLR A. Furthermore, according to the aforementioned method for configuring routing priority, the priority of the direct route to an MSC/VLR signaling point is higher than the priority of the indirect route to the MSC/VLR signaling point via the signaling point of the backup server of the MSC/VLR. For example, the priority of the direct route to signaling point AA of MSC/VLR A is higher than the priority of the indirect route to signaling point AA of MSC/VLR A via signaling point BB of MSC/VLR B.

If MSC/VLR A that was down is recovered within a period of one periodic location update, and a user originally served by MSC/VLR A has not performed location update with another server in the MSC Pool, the signaling procedure for calling the user includes the following.

Processes 1~2: The HLR sends, via the STP, a PRN message to MSC/VLR A to obtain a roaming number of the user. Because MSC/VLR A has recovered, a route with high priority is chosen according to aforementioned configuration of route priority. Therefore, the STP sends the PRN message to MSC/VLR A, wherein the addressing mode is DPC+SSN.

Process 3: If the user is not registered in the local server (i.e., MSC/VLR A) and the MSC number in the PRN message is the MSC number of the local server (i.e., the number of MSC A), MSC/VLR A obtains user data from the backup server of MSC/VLR A (i.e., MSC/VLR B), and the obtained user data is only a small portion of all subscription data of the user, mainly including the IMSI and the LAI. If the user is registered in the backup VLR (i.e., MSC/VLR B), Process 4 is performed; otherwise, Process 7 is performed.

If the user is registered in MSC/VLR A, and MSC/VLR A is processing a service for the user, a PRN ACK message indicating that the user is busy may be directly returned to the HLR, and this service processing is terminated.

Process 4: If the user is in a power-off state, MSC/VLR A returns a PRN ACK message indicating that the user is absent to the HLR via the STP; otherwise, Process 5 is performed.

Process 5: MSC/VLR A updates the location information of the user, and obtains and recovers the user data from the HLR. If the recovery of user data fails, MSC/VLR A returns a PRN ACK message indicating that the user is unreachable to the HLR, and terminates this service processing. Herein, the user data recovered is all subscription user data in the HLR.

Process 6: MSC/VLR A allocates a roaming number of the local server for the user, and returns a PRN ACK message containing the allocated roaming number to the HLR, so that the HLR may successfully obtain the roaming number of the user and complete the call, and this service processing is terminated.

Process 7: If paging for all BSC/RNCs is allowed, MSC/VLR A interacts with the HLR to recover user data; otherwise, Process 9 is performed. Herein, in the networking structure including the MSC Pool, the paging for all BSC/RNCs switch usually is off in a default state.

If the recovery of user data fails, MSC/VLR A returns a PRN ACK message indicating that user is unreachable to the HLR, and this service processing is terminated.

Process 8: MSC/VLR A allocates a roaming number of the local server for the user, and returns a PRN ACK message containing the allocated roaming number to the HLR, so that the HLR may successfully obtain the roaming number of the user and complete the call, and this service processing is terminated.

Process 9: MSC/VLR A returns a PRN ACK message indicating that the user is unreachable to the HLR, and this service processing is terminated.

Based on the above method of the present invention, this invention also provides two systems for called party recovery in a Mobile Switching Center Pool, including: an HLR and an MSC Pool including multiple MSC/VLRs. The MSC Pool further includes a backup server of each MSC/VLR. The two systems correspond to the cases as shown in FIGS. 5 and 6 respectively. In the first system, the MSC/VLR serving the user is down, the user has not initiated any calling service or location update, and the user is the called party. In the second system, the MSC/VLR serving the user is recovered within a period of one the periodic location update after the MSC/VLR is down, and within the period of one periodic location update the user has not initiated any calling service or location update and the user is the called party. The interconnections and functions of elements in the system in the present invention are described under these two cases respectively hereunder.

In the first case, the MSC/VLR serving the user is down, the user has not initiated any calling service or location update, and the user is the called party.

The HLR is used to send a call signaling to the backup server of the MSC/VLR that is down, insert user data into the backup server when the backup server initiates a location update, and update the MSC/VLR that serves the user as the backup server. The backup server is used to back up the user data of the MSC/VLR, initiate a page request to the user and initiate a location update for the user when receiving the call signaling from the HLR, register the user data of the user inserted by the HLR.

The backup server may further back up the registered user data of the user at the own backup server.

The first system further includes: a user terminal and the RAN to which the user terminal belongs. In this case, after the user data of the user is registered in the backup server, the backup server may allocate a TMSI containing a null-NRI to the user terminal, and sends, via the RAN, to the user terminal a TMSI re-allocation command containing the TMSI and non-broadcast LAI. After receiving the non-broadcast LAI, the user terminal may initiate a location update request containing a null-NRI to the RNC in the RAN to which the user terminal belongs, the RNC may allocate a new MSC/VLR as the serving MSC/VLR for the user according to the null-NRI.

In this case, the processing of the first system of the present invention corresponds to the flow chart shown in FIG. 5, this system may implement every process as shown in FIG. 5, and further detailed description on every process in FIG. 5 is omitted hereafter.

In the second case, the MSC/VLR serving the user is recovered within a period of one periodic location update after the MSC/VLR is down, and within the period of one periodic location update the user has not initiated any calling service or location update and the user is the called party.

The HLR may be used to send a call signaling to the MSC/VLR that is down and then is recovered, output the user data of the user to the MSC/VLR that is down and then is recovered, and receives the roaming number of the user from the MSC/VLR that is down and then is recovered. The MSC/VLR may be used to obtain the backup user data of the user from the backup server of the MSC/VLR and update the location information of the user after receiving the call signaling, and obtain the user data of the user from the HLR and recover the user data, allocate a roaming number of the user and return the allocated roaming number to the HLR.

When obtaining user data of the user from the HLR and recovering the user data, if the recovery of user data fails, the MSC/VLR may further return a response indicating that user is unreachable to the HLR. When obtaining backup data of the user from the backup server of the MSC/VLR, if the backup user data of the user is not in the backup server, the MSC/VLR may be further used to obtain the user data of the user from the HLR and recover the user data, allocate a roaming number for the user, and return the allocated number to the HLR.

In this case, the processing of the second system of the present invention corresponds to the flow chart shown in FIG. 6, this system may implement every process as shown in FIG. 6, and further detailed description on every process in FIG. 6 is omitted hereafter.

The above two systems in the present invention may further include: STP, which may be used, when the MSC/VLR is valid (for example, is recovered after the MSC/VLR is down or operates normally), to send the call signaling from the HLR to the MSC/VLR. When the MSC/VLR fails (for example, the MSC/VLR is down), the STP may be used to send the call signaling from the HLR to the backup server of the MSC/VLR. Pre-configuration may be done at the STP, e.g., the priority of the direct route to the destination MSC/VLR is higher than the priority of the indirect route to the MSC/VLR via the backup server of the MSC/VLR. Alternatively, the signaling point of the backup server of the MSC/VLR is the SCCP load sharing signaling point of the signaling point of the MSC/VLR, and the priority of the signaling point of the backup server of the MSC/VLR is lower than the priority of the signaling point of the MSC/VLR. When the MSC/VLR fails, the STP may send the call signaling to the backup server of the MSC/VLR via the indirect route with low priority, or send the call signaling to the signaling point of the backup server of the MSC/VLR with low priority.

Furthermore, in the two systems of the present invention, two backup modes may be used. In the centralized backup, one or multiple backup centers may be configured in the MSC Pool, and each backup center is responsible for backing up the user data of one or more MSC/VLRs, and hence the backup server of one MSC/VLR may be one of the backup centers. In the chain-style backup, the user data of one MSC/VLR is backed up in another MSC/VLR in the MSC Pool, and hence the backup server of one MSC/VLR is another MSC/VLR in the MSC Pool.

The present invention also provides a system that may be used for called party recovery in a Mobile Switching Center Pool under either of the above two cases. This system may realize all functions of the above two systems, and will not be further described hereafter.

Moreover, the present invention also discloses two switch devices, which are used to control voice or data interaction, process call signaling interaction, realize the interconnection and interworking among access network devices. The two switch devices are located in an MSC Pool including multiple MSC/VLRs, and will be introduced respectively hereunder.

The first switch device is used as the backup server of at least one MSC/VLR in the MSC Pool, the at least one MSC/VLR is used as the main server of the switch device, and the switch device includes: a first module, used to store the backup user data for the main server; a second module, when the called user of a call signaling is not a user of the local server and the call signaling is not for calling the local server, is used to obtain the backup user data of the called user from the first module, initiate a paging request and a location update for the called user, then remove the backup user data of the called user from the first module, and update the switch device where the second module locates to make the switch device serve the called user.

In actual applications, such a switch device is usually an MSC/VLR used as a backup server of an MSC/VLR or a backup center. The first module often refers to the backup VLR of an MSC/VLR or a backup register unit having similar functions as a backup VLR in the backup center. The second module may include: a control module, a location update module, a paging module and a register unit.

The control module is used, when the called user in a call signaling is not a user of the local server and the call signaling is not for calling the local server, to obtain the backup user data of the called user from the first module and trigger the paging module; trigger the location update module when the user that responds to the paging request is not registered in the local server; remove the backup user data of the called user from the first module when the HLR confirms canceling the location of the called user; and obtain the user data of the called user from the HLR and inserting the user data into the register unit. The location update module, after triggered by the control module, initiates a location update for the called user to the HLR. The paging module, after triggered by the control module, initiates the page request to the called user according to the backup user data of the called user obtained by the control module, and receives a paging response. The register unit (which usually refers to the VLR of an MSC/VLR or a register unit having similar functions as a VLR in a backup center), registers the called user in the local server according to the user data of the called user inserted by the control module. Any one of, or any combination of, the control module, the location update module, the paging module, and the register unit may be an existing functional module in a switch device such as an MSC/VLR or a backup center, or an additional module in a switch device such as an MSC/VLR or a backup server according to the present invention, which is not limited in the present invention. No matter how the internal modules are divided to realize the above switch device, if the functions realized are the same as the functions of the above switch device, the realization will be deemed as a variant of an embodiment of the present invention, and falls into the protection scope of the present invention.

The second switch device is located in an MSC Pool including multiple MSC/VLRs, and the switch device is used as a main server, furthermore, the MSC Pool includes a backup server of the switch device. The switch device includes: a third module, used to obtain the backup user data of the called user from the backup server of the switch device, updates the location information of the called user, recovers the user data of the called user, and provides a roaming number of the called user when the called user in a call signaling is not a user of the local server and the call signaling is for calling the local server. The third module includes: a control module, a roaming number allocation module and a register unit. This switch device usually refers to an MSC/VLR in an MSC Pool that is used as a main server.

The control module is used, when the called user in the call signaling is not a user of the local server and the call signaling is for calling the local server, to obtain the backup user data of the called user from the backup server of the switch device, update the location information of the called user, obtain the user data of the called user from the HLR and output the user data to the register unit, and trigger the roaming number allocation module. The roaming number allocation module is used, after being triggered by the control module, to allocate a roaming number for the called user and provide the roaming number to the HLR. The register unit is used to recover the user data of the called user according to the user data from the control module. The register unit is usually a VLR in an MSC/VLR. Any one of, or any combination of, the control module, the roaming number allocation module and the register unit may be an existing functional module in a switch device such as an MSC/VLR, or an additional module in a switch device such as an MSC/VLR according to the present invention, which is not limited in the present invention. No matter how the internal modules are divided to realize the above switch device, if the functions realized are the same as the functions of the above switch device, the realization will be deemed as a variant of an embodiment of the present invention, and falls into the protection scope of the present invention.

Figure 7:
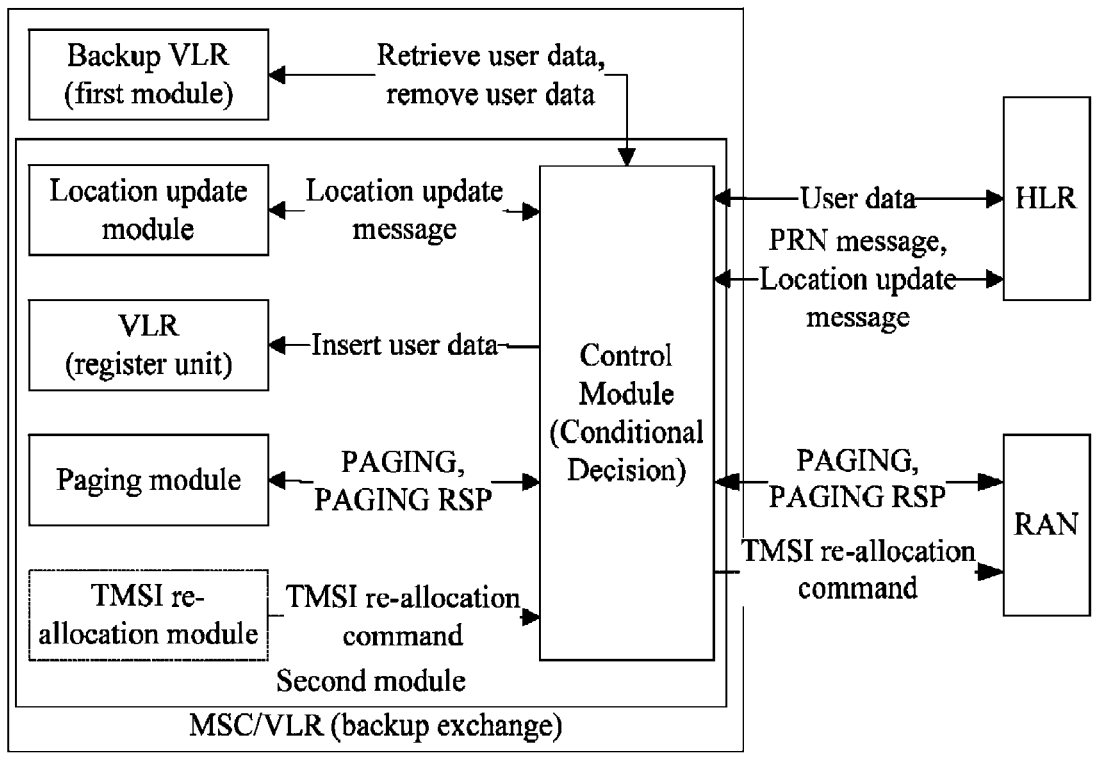
FIG. 7 shows the internal structure of an MSC/VLR serving as a backup server according to an embodiment of the present invention.
Figure 8:
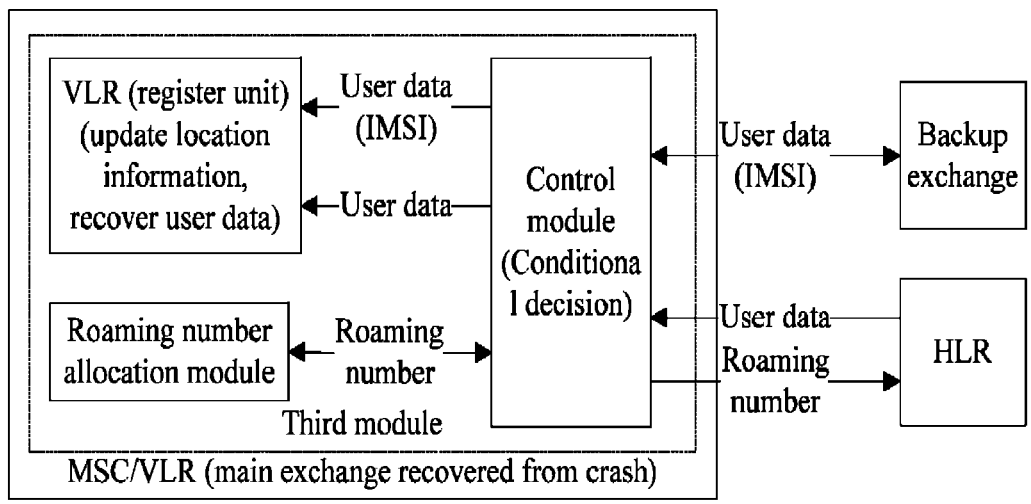
FIG. 8 shows the internal structure of an MSC/VLR that is recovered after the MSC/VLR is down according to an embodiment of the present invention.

The internal structures and the implementation principles of the two switch devices are described in detail hereunder with FIGS. 7 and 8 respectively.

FIG. 7 shows the internal structure of an MSC/VLR used as a backup server in the present invention. An embodiment of the MSC/VLR is MSC/VLR B in FIG. 5. The MSC/VLR as shown in FIG. 7 may realize all functions that MSC/VLR B in FIG. 5 may realize. As shown in FIG. 7, the MSC/VLR is connected to the HLR and the RAN, the MSC/VLR may include: a control module, a location update module, a VLR, and a paging module. The MSC/VLR may further include: a backup VLR, which is used to store the backup user data for the main server. The control module, the location update module, the VLR and the paging module may be existing modules in the MSC/VLR, hence the basic functions realized by these modules are familiar to the skilled in the art and will not be described hereafter, and only additional functions based on the present invention will be described. The functions realized by the MSC/VLR as shown in FIG. 7 include: when the MSC/VLR serving the user is down, the user has not initiated any calling service or location update and the user is the called party, the backup server of the MSC/VLR serving the user performs the processing for the recovery of the called party.

The control module may receive a call signaling from the HLR, and when the called user is not registered in the local server and the MSC number in the call signaling is not the MSC number of the local server, obtain the backup user data of the called user from the backup VLR and trigger the paging module. The control module receives a paging response from the RAN, and triggers the location update module when the user who responds to the paging request is not registered in the local server. After the HLR confirms canceling the location of the called user, the control module removes the user data of the called user from the backup VLR. The control module obtains the user data from the HLR and inserts the user data into the VLR. The location update module, after triggered by the control module, initiates a location update for the called user to the HLR through the control module. After being triggered by the control module, the paging module initiates a paging request for the called user to the RAN through the control module according to the backup user data obtained by the control module, and receives a paging response from the RAN through the control module. The VLR receives the user data of the called user inserted by the control module, and registers the called user in the local server. In this way, as shown in FIG. 7, the MSC/VLR acting as a backup server may be updated to make the MSC/VLR serve the called user, hence the called party recovery is realized. When the control module obtains the user data of the called user from the backup VLR, if the user data of the called user is not in the backup VLR, the control module may return a response indicating that the user is unreachable to the HLR. If the user data of the called user is in the VLR and the called user is in a power-off state, the control module may return a response indicating that the user is absent to the HLR. If the control module triggers the paging module to initiate a paging request to the called user, after a pre-defined time period, the control module may return a response indicating that the user is unreachable to the HLR.

Furthermore, the control module may back up the user data of the called user registered by the VLR at the backup server of the MSC/VLR. To evenly distribute the users originally registered in the MSC/VLR that is down to other MSC/VLRs in the MSC Pool to achieve load sharing, the MSC/VLR as shown in FIG. 7 may further include: a TMSI re-allocation module. In this case, the control module triggers the TMSI re-allocation module after the user data of the called user is registered at the VLR. The TMSI re-allocation module, after triggered by the control module, re-allocates a TMSI containing a null-NRI to the called user, and sends the RAN a TMSI re-allocation command containing the TMSI and non-broadcast LAI through the control module. In this way, when the user terminal of the called user receives the non-broadcast LAI, the user terminal may initiate a location update to the RNC in the RAN, and the RNC may allocate a new MSC/VLR in the MSC/VLR Pool as an MSC/VLR serving the called user according to the null-NRI contained in the TMSI sent by the user terminal. Furthermore, when the paging response is received, if the TMSI re-allocation switch is on, and the RAN enables the Iu/A-Flex function, and the called user is not registered in the local server, and a cancel user location message is received during the location update, the TMSI re-allocation module may allocate a TMSI containing a null-NRI to the called user and issues a TMSI re-allocation command containing the TMSI and a non-broadcast LAI to the RAN through the control module. In other cases, the TMSI re-allocation module allocates a local TMSI to the called user, and issues a TMSI re-allocation command containing the TMSI to the RAN through the control module.

FIG. 8 shows the internal structure of an MSC/VLR that is down and then recovered in this present invention. An embodiment of the MSC/VLR is MSC/VLR A in FIG. 6. The MSC/VLR as shown in FIG. 8 may realize all functions that MSC/VLR A in FIG. 6 realizes. As shown in FIG. 8, the MSC/VLR includes: a VLR, a control module and a roaming number allocation module. The control module, the VLR and the roaming number allocation module may be existing modules in the MSC/VLR, hence the basic functions realized by these modules are familiar to the skilled in the art and will not be described hereafter. Only the additional functions based on the present invention will be described. The functions realized by the MSC/VLR as shown in FIG. 8 include: when the MSC/VLR serving the user is down and the user has not initiated any calling service or location update, if the MSC/VLR serving the user is recovered during a period of one periodic location update after the MSC/VLR is down and the user has not initiated any calling service or location update, the user is the called party within the period of one periodic location update, the MSC/VLR that is down performs the processing for the recovery of the called party.

The control module receives the call signaling from the HLR, when the called user is registered in the local server and the MSC number in the call signaling is the MSC number of the local server, obtains the backup user data of the called user from the backup server of the MSC/VLR, updates the location information of the called user in the VLR, obtains the user data of the called user from the HLR and recovers the user data of the called user in the VLR, and triggers the roaming number allocation module. After triggered by the control module, the roaming number allocation module allocates a local roaming number to the called user and returns the allocated roaming number to the HLR through the control module.

Furthermore, when recovering the user data of the called user, if the recovery of the user data fails, the VLR sends a response indicating that the user is unreachable to the HLR through the control module. Furthermore, when obtaining the backup user data of the called user from the backup server of the MSC/VLR, if the backup user data of the called user is not in the backup server, the control module may further obtain the user data of the called user from the HLR, and trigger the roaming number allocation module. If the backup user data of the called user is not in the backup server, and paging for all BSC/RNCs is not allowed, the control module may further return a response indicating that the user is unreachable to the HLR. If the backup data of the called user is in the backup server and the called user is in the power-off state, the control module may further return a response indicating that the user is absent to the HLR.

Furthermore, the present invention also provides another switch device, which integrates all functions of the switch devices shown in FIGS. 7 and 8. The switch device at least includes: a control module, a backup VLR, a location update module, a VLR, a paging module, and a roaming number allocation module, and may further include a TMSI re-allocation module. When the MSC/VLR serving a user is down, and the user has not initiated any calling service or location update and the user is the called party, the switch device may be used for recovering the called party as the backup server of the MSC/VLR serving the user, the detailed implementation is shown in FIG. 7. When the MSC/VLR serving the user is down and the user has not initiated any calling service or location update, if the MSC/VLR serving the user is recovered within a period of one periodic location update after the MSC/VLR is down, and the user has not initiated any calling service or location update, the switch device may be used to recover the called party as the MSC/VLR serving the user after the MSC/VLR is down when the user is the called party during the same period of one periodic location update, where the detailed implementation is shown in FIG. 8.

The present invention also discloses a signaling forwarding device, such as the STP in the system of the present invention, and the signaling forwarding device includes: a priority configuration unit and a signaling forwarding unit. The priority configuration unit is used to configure the priority of the direct route to the switch device to be higher than the priority of the indirect route to the switch device via the backup server of the switch device. In this case, the signaling forwarding unit receives a call signaling from the HLR, confirms the switch device (e.g., the serving MSC/VLR) serving the called user in the call signaling, checks the priority configuration unit, and when the serving switch device is valid, sends the call signaling to the serving switch device via the direct route with high priority; and when the serving switch device fails, sends the call signaling to the backup server of the service switch device via the indirect route with low priority. Alternatively, the priority configuration unit may be used to configure the signaling point of the backup server of the switch device to be the SCCP load sharing signaling point of the switch device, and the priority of the signaling point of the backup server of the switch device is lower than the priority of the signaling point of the switch device. In this case, the signaling forwarding unit receives the call signaling from the HLR, identifies the serving switch device of the called user in the call signaling, consults the priority configuration unit, when the serving switch device is valid, sends the call signaling to the signaling point of the serving switch device with high priority; when the serving switch device fails, sends the call signaling to the signaling point of the backup server of the serving switch device with low priority. The signaling forwarding device in the present invention is able to perform all functions of the STP as shown in FIGS. 5 and 6, which will not be described hereafter, but are nevertheless within the protection scope of the present invention.

The foregoing descriptions are only preferred embodiments of the present invention and are not for use in limiting the protection scope thereof. Any modification, equivalent replacement or improvement made under the spirit and principles of the present invention is included in the protection scope of the claims of the present invention.

What is claimed is:

1. A method for called party recovery in a Mobile Switch Center (MSC) Pool, applied in a system that comprises a Home Location Register (HLR) and an MSC Pool including multiple Mobile Switch Centers/Visitor Location Registers (MSC/VLRs), comprising: configuring a backup server for each MSC/VLR in the MSC Pool; the method further comprising: if an MSC/VLR serving a user is down, the user does not initiate a calling service or a location update, and the user is called,
   sending, by the HLR, a call signaling to the backup server of the MSC/VLR that is down;
   initiating, by the backup server of the MSC/VLR, a paging request to the user and initiating a location update for the user to the HLR;
   registering, by the HLR, user data of the user at the backup server of the MSC/VLR and switching the MSC/VLR serving the user to the backup server of the MSC/VLR;
   wherein initiating the location update for the user to the HLR; the HLR registering user data of the user at the backup server of the MSC/VLR and switching the MSC/VLR serving the user to the backup server of the MSC/VLR comprise:
   sending, by the backup server of the MSC/VLR, a location update request to the HLR after receiving a paging response from the user;
   sending, by the HLR, a message to the backup server to cancel user location;
   removing, by the backup server, the user data of the user backed up at the local server from the MSC/VLR that is down and returning a cancel user location confirmation to the HLR;
   inserting, by the HLR, the user data of the user into the backup server and registering the backup server as an serving MSC/VLR of the user.

2. The method of claim 1, wherein initiating the paging request to the user comprises:
   obtaining, if the user is not registered in a local server and an MSC number contained in the call signaling is not the MSC number of the local server, the user data of the user backed up at the local server by the MSC/VLR serving the user when the backup server receives the call signaling;

initiating the paging request to the user according to the obtained user data.

3. The method of claim 1, further comprising:
returning a response indicating that the user is unreachable to the HLR when initiating the paging request to the user.

4. The method of claim 3, wherein returning the response indicating that the user is unreachable to the HLR when initiating the paging request to the user comprises:
configuring a timer;
activating the timer when initiating the paging request to the user;
returning the response indicating that the user is unreachable after the timer expires.

5. The method of claim 1, further comprising:
configuring a timer;
activating the timer when initiating the paging request to the user;
returning a response containing a roaming number of the user to the HLR if a paging response is received before the timer expires;
returning a response indicating that the user is unreachable to the HLR if no paging response is received before the timer expires.

6. The method of claim 1, wherein initiating the paging request to the user comprises:
initiating multiple paging requests to the user.

7. The method of claim 1, further comprising:
configuring, in a Signaling Transfer Point (STP), the priority of a direct route to the MSC/VLR to be higher than the priority of an indirect route to the MSC/VLR via the backup server of the MSC/VLR; or
configuring, in the STP, a signaling point of the backup server of the MSC/VLR to be a Signaling Connection Control Part (SCCP) load sharing signal point of a signaling point of the MSC/VLR, and the priority of the signaling point of the backup server of the MSC/VLR to be lower than the signaling point of the MSC/VLR; wherein
sending the call signaling to the backup server of the MSC/VLR that is down comprises:
sending, by the HLR, the call signaling to the STP;
sending, by the STP, the call signaling to the backup server of the MSC/VLR that is down via the indirect route when confirming that the MSC/VLR is down; or
sending, by the HLR, the call signaling to the STP;
sending, by the STP, the call signaling to the signaling point of the backup server of the MSC/VLR with low priority when confirming that the MSC/VLR is down;
sending the cancel user location message to the backup server comprises:
sending, by the HLR, the cancel user location message to the STP; and
sending, by the STP, the cancel user location message to the backup server of the MSC/VLR via the indirect route when confirming that the MSC/VLR is down; or
sending, by the HLR, the cancel user location message to the STP;
sending, by the STP, the cancel user location message to the signaling point of the backup server of the MSC/VLR which is load sharing with the signaling point of the MSC/VLR when confirming that the MSC/VLP is down; and the priority of the signaling point of the backup server of the MSC/VLR is lower than the signaling point of the MSC/VLR.

8. The method of claim 1, further comprising:
backing up, by the backup server, the user data of the user registered in the backup server at the backup server of the backup server after the HLR registers the user data of the user at the backup server and switches the MSC/VLR serving the user to the backup server.

9. The method of claim 1, further comprising:
sending, by the backup server, a location update request to the HLR if the user is not registered in the local server after the backup server receives a paging response from the user.

10. The method of claim 1, further comprising:
allocating, by the backup server, a Temporary Mobile Subscriber Identity (TMSI) containing a null Network Resource Identifier (null-NRI) to the user after the HLR registers the user data of the user at the backup server and switches the MSC/VLR serving the user to the backup server, and sending, via a Radio Access Network (RAN) to which the user belongs a TMSI re-allocation command containing the TMSI and a non-broadcast Location Area Identity (LAI) to the user;
initiating a location update request containing the null-NRI to a Radio Network Controller (RNC) to which the user belongs after receiving the non-broadcast LAI;
allocating, by the RNC, a new MSC/VLR in the MSC Pool as a serving MSC/VLR for the user according to the null-NRI.

11. The method of claim 1, wherein configuring the backup server for each MSC/VLR in the MSC Pool comprises:
configuring a backup center as the backup server of the MSC/VLRs in the MSC Pool; or
configuring one MSC/VLR as the backup server of another MSC/VLR in the MSC/VLR Pool.

12. A method for called party recovery in a Mobile Switch Center (MSC) Pool, applied in a system that comprises a Home Location Register (HLR) and an MSC Pool including multiple Mobile Switch Centers / Visitor Location Registers (MSC/VLRs), comprising: configuring a backup server for each MSC/VLR in the MSC Pool; the method further comprising: if an MSC/VLR serving a user is recovered within a period of one periodic location update after the MSC/VLR is down, the user has not initiated any calling service or location update, and the user is called during the period of one periodic location update,
one of: configuring, in a Signaling Transfer Point (STP), the priority of a direct route to the MSC/VLR to be higher than the priority of an indirect route to the MSC/VLR via the backup server of the MSC/VLR; or configuring, in the STP, a signaling point of the backup server of the MSC/VLR to be a Signaling Connection Control Part (SCCP) load sharing signal point of a signaling point of the MSC/VLR, and the priority of the signaling point of the backup server of the MSC/VLR to be lower than the signaling point of the MSC/VLR;
sending, by the HLR, a call signaling to the MSC/VLR that is recovered;
obtaining, by the MSC/VLR that is recovered, first user data of the user, updating location information of the user, recovering second user data of the user in the HLR, allocating a roaming number of a local server for the user and returning the roaming number to the HLR;
wherein sending the call signaling to the MSC/VLR that is recovered comprises:
sending, by the HLR, the call signaling to the STP when the STP confirms that the MSC/VLR is valid; and
one of: sending, by the STP, the call signaling to the MSC/VLR that is recovered via the direct route; or sending, by the HLR, the call signaling to the STP when the STP confirms that the MSC/VLR is valid; and sending, by the STP, the call signaling to the signaling point of the MSC/VLR that is recovered; and the priority of the signaling point of the MSC/VLR is higher than the priority of the signaling point of the backup server of the MSC/VLR which is load sharing with the signaling point of the MSC/VLR.

13. The method of claim 12, wherein obtaining the first user data of the user comprises:

obtaining the first user data of the user from the backup server of the MSC/VLR when the user is not registered in the local server and a MSC number in the call signaling is a MSC number of the local server.

14. The method of claim 12, wherein obtaining the first user data of the user comprises:

obtaining, by the MSC/VLR that is recovered, the first user data of the user from the backup server of the MSC/VLR; and obtaining the first user data from the HLR if there are the first user data in the backup server of the MSC/VLR.

15. The method of claim 12, wherein configuring the backup server for each MSC/VLR in the MSC Pool comprises:

configuring a backup center as the backup server of the MSC/VLRs in the MSC Pool; or configuring one MSC/VLR as the backup server of another MSC/VLR in the MSC/VLR Pool.

16. A system for called party recovery in a Mobile Switch Center (MSC) Pool, comprising:

a Home Location Register (HLR) and a backup server of each MSC/VLR in the MSC Pool including multiple Mobile Switch Centers / Visitor Location Registers (MSC/VLRs); wherein the HLR is configured to send, when an MSC/VLR serving a user is down, the user has not initiated any calling service or location update and the user is called, a call signaling to the backup server of the MSC/VLR that is down; insert, when the backup server initiates a location update, user data of the user to the backup server and switch the MSC/VLR serving the user to the backup server;

the backup server of the MSC/VLR that is down is configured to back up the user data of the user on the MSC/VLR, initiate a paging request to the user and initiate a location update for the user when receiving the call signaling from the HLR, register the user data of the user inserted by the HLR; and a user terminal of the user and a Radio Access Network (RAN) to which the user terminal belongs; wherein the backup server is configured to, after registering the user data of the user, allocate a Temporary Mobile Subscriber Identity (TMSI) containing a null Network Resource Identifier (null-NRI) to the user, and issue, via the RAN, a TMSI re-allocation command containing the TMSI and a non-broadcast Location Area Identity (LAI) to the user terminal of the user;

the user terminal is configured to, after receiving the non-broadcast LAI, initiate a location update request with the null-NRI to the RAN;

the RAN is configured to allocate a new MSC/VLR in the MSC Pool as an MSC/VLR serving the user for the user according to the null-NRI.

17. The system of claim 16, wherein the backup server is further configured to back up the user data of the user registered at the backup server at a backup server of the backup server.

18. The system of claim 16, further comprising: a Signaling Transfer Point (STP), wherein the STP is configured with that: the priority of a direct route to the MSC/VLR is higher than the priority of an indirect route to the MSC/VLR via the backup server of the MSC/VLR; or a signaling point of the backup server of the MSC/VLR is a Signaling Connection Control Part (SCCP) load sharing signal point of a signaling point of the MSC/VLR, and the priority of the signaling point of the backup server of the MSC/VLR is lower than the signaling point of the MSC/VLR;

the STP is configured to, when the MSC/VLR is down, send the call signaling to the backup server of the MSC/VLR via the indirect route, or send the call signaling to the signaling point of the backup server of the MSC/VLR which is load sharing with the signaling point of the MSC/VLR; and the priority of the signaling point of the backup server of the MSC/VLR is lower than the signaling point of the MSC/VLR.

19. The system of claim 16, wherein the MSC Pool is configured with a backup center as the backup server of the MSC/VLRs in the MSC Pool; or, one MSC/VLR as the backup server of another MSC/VLR in the MSC Pool.

20. A system for called party recovery in a Mobile Switch Center (MSC) Pool, comprising:

a Home Location Register (HLR) and an MSC Pool including multiple Mobile Switch Centers / Visitor Location Registers (MSC/VLRs) wherein the MSC Pool further comprises a backup server of each MSC/VLR; wherein the HLR is configured to, when an MSC/VLR serving a user is down and is recovered within a period of one periodic location update, the user has not initiated any calling service or location update within the period of one periodic location update, and the user is called, send a call signaling to the MSC/VLR that is recovered, output user data of the user to the MSC/VLR that is recovered, and receive a roaming number of the user from the MSC/VLR that is recovered;

the MSC/VLR is configured to, when the MSC/VLR that is down is recovered within the period of one periodic location update, obtain backup user data of the user from the backup server of the MSC/VLR after receiving the call signaling, update location information of the user, obtain the user data of the user from the HLR and recover the user data, allocate a roaming number for the user and return the roaming number to the HLR; and a Signaling Transfer Point (STP), wherein the STP is configured with that: the priority of a direct route to the MSC/VLR is higher than the priority of an indirect route to the MSC/VLR via the backup server of the MSC/VLR; or a signaling point of the backup server of the MSC/VLR is a Signaling Connection Control Part (SCOP) load sharing signal point of a signaling point of the MSC/VLR, and the priority of the signaling point of the backup server of the MSC/VLR is lower than the signaling point of the MSC/VLR;

the STP is configured to, when the MSC/VLR is recovered, send the call signaling to the MSC/VLR via the direct route; or send the call signaling to the signaling point of the MSC/VLR;

and the priority of the signaling point of the MSC/VLR is higher than the priority of the signaling point of the backup server of the MSC/VLR which is load sharing with the signaling point of the MSC/VLR.

21. The system of claim 20, wherein the MSC Pool is configured with a backup center as the backup server of the MSC/VLRs in the MSC Pool; or, one MSC/VLR as the backup server of another MSC/VLR in the MSC Pool.

22. A switch device, located in a Mobile Switch Center (MSC) Pool including multiple Mobile Switch Centers / Visitor Location Registers (MSC/VLRs), wherein the switch device is a backup server of at least one MSC/VLR in the MSC Pool, and the at least one MSC/VLR is a main server of the switch device, and the switch device comprises:
- a first module, configured to store backup user data of on the main server;
- a second module, configured to, when a called user in a call signaling is not a user of a local server and the call signaling is not for calling the local server, obtain the backup user data of the called user from the first module, initiate a paging request to the called user, initiate a location update for the called user, remove the backup user data of the called user from the first module, and switch the switch device in which the second module is located to a new switch device serving the called user;
- wherein the second module comprises: a control module, a location update module, a paging module and a register unit; wherein
- the control module is configured to, when the called user in the call signaling is not a user of the local server and the call signaling is not for calling the local server, obtain the backup user data of the called user from the first module and trigger the paging module; when the called user that responds to the paging request is not registered at the local server, trigger the location update module; when a Home Location Register (HLR) confirms canceling location of the called user, remove the backup user data of the called user from the first module; obtain the user data of the called user from the HLR and insert the user data into the register unit;
- the location update module is configured to initiate a location update for the called user to the HLR after triggered by the control module;
- the paging module is configured to initiate the paging request to the called user according to the backup user data of the called user obtained by the control module after triggered by the control module, and receive a paging response;
- the register unit is configured to register the called user at the local server according to the user data of the called user inserted by the control module; and
- a Temporary Mobile Subscriber Identity (TMSI) re-allocation module, configured to, after triggered by the control module after the register unit registers the called user, allocate a TMSI containing a null Network Resource Identifier (null-NRI) to the called user, and issue a TMSI re-allocation command containing the TMSI and a non-broadcast Location Area Identity (LAI) to a Radio Access Network (RAN) via the control module.

23. The switch device of claim 22, wherein the control module is further configured to back up the user data of the called user registered by the register unit at the backup server the switch device.

24. The switch device of claim 22, further comprising:
a roaming number allocation module; wherein
- the control module is further configured to, when the called user in the call signaling is not a user of the local server and the call signaling is for calling the local server, obtain the backup user data of the called user from the backup server of the switch device, update location information of the called user, obtain user data of the called user and recover the user data to the register unit, and trigger the roaming number allocation module;
- the roaming number allocation module is configured to, after triggered by the control module, allocate a roaming number for the called user and send the roaming number to the HLR.

* * * * *

UNITED STATES PATENT AND TRADEMARK OFFICE
CERTIFICATE OF CORRECTION

PATENT NO. : 8,160,582 B2  Page 1 of 1
APPLICATION NO. : 12/401419
DATED : April 17, 2012
INVENTOR(S) : Runsheng Han et al.

It is certified that error appears in the above-identified patent and that said Letters Patent is hereby corrected as shown below:

In the Claims

In column 22, claim 24, line 25, after "the call signaling is" replace "nota" with --not a--.

Signed and Sealed this
Twenty-fourth Day of July, 2012

David J. Kappos
*Director of the United States Patent and Trademark Office*